United States Patent
Zhao et al.

(10) Patent No.: US 9,198,157 B2
(45) Date of Patent: Nov. 24, 2015

(54) PAGING FOR LOCAL IP ACCESS PACKETS

(75) Inventors: Lijun Zhao, Santa Monica, CA (US); Parag Arun Agashe, San Diego, CA (US); Peter H. Rauber, San Diego, CA (US); Andrei Dragos Radulescu, San Diego, CA (US); Damanjit Singh, San Diego, CA (US); Gavin Bernard Horn, La Jolla, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 824 days.

(21) Appl. No.: 12/774,538

(22) Filed: May 5, 2010

(65) Prior Publication Data

US 2010/0284387 A1 Nov. 11, 2010

Related U.S. Application Data

(60) Provisional application No. 61/176,753, filed on May 8, 2009.

(51) Int. Cl.
| | |
|---|---|
| *H04L 12/28* | (2006.01) |
| *H04W 68/00* | (2009.01) |
| *H04W 8/08* | (2009.01) |
| *H04W 84/04* | (2009.01) |

(52) U.S. Cl.
CPC .............. *H04W 68/00* (2013.01); *H04W 8/082* (2013.01); *H04W 84/045* (2013.01)

(58) Field of Classification Search
USPC ................ 370/338, 328, 410; 455/509, 435.1
See application file for complete search history.

(56) References Cited

U.S. PATENT DOCUMENTS

| | | | | |
|---|---|---|---|---|
| 7,089,023 | B2 * | 8/2006 | Vialen et al. ................... | 455/458 |
| 7,471,957 | B2 * | 12/2008 | Palkisto et al. ............... | 455/458 |
| 7,526,288 | B2 * | 4/2009 | Eom et al. ................... | 455/435.1 |
| 7,710,987 | B2 * | 5/2010 | Jayapalan et al. ............ | 370/410 |
| 7,797,002 | B2 * | 9/2010 | Take .............................. | 455/458 |
| 8,463,300 | B2 * | 6/2013 | Chun et al. .................... | 455/458 |
| 2006/0116136 | A1 * | 6/2006 | Noma ........................... | 455/458 |

(Continued)

FOREIGN PATENT DOCUMENTS

| | | |
|---|---|---|
| JP | 2006261869 A | 9/2006 |
| WO | WO-02065808 A1 | 8/2002 |

(Continued)

OTHER PUBLICATIONS

Alcatel-Lucent: "On architecture for LIPA for HNB and HeNB" 3GPP Draft; S2-093169, HNB LIPA Architecture 3G-EUTRAN-V3_Clean, 3rd Generation Partnership Project (3GPP), Sophia-Antipolis Cedex; France, Tallinn, Estonia, May 11-15, 2009, XP050346264. (5 pages).

(Continued)

*Primary Examiner* — Phuc Tran
(74) *Attorney, Agent, or Firm* — Fariba Yadegar-Bandari

(57) ABSTRACT

Local IP access paging schemes facilitate paging of an access terminal when packets destined for the access terminal are received via local IP access. In some implementations, a local entity acquires information that enables local paging of the access terminal by sniffing messages passing through the local entity. In some implementations, a local entity sends a packet or message to cause the core network to page an access terminal when a local IP access packet destined for the access terminal arrives at the local entity.

19 Claims, 14 Drawing Sheets

(56) References Cited

U.S. PATENT DOCUMENTS

2006/0285512 A1* 12/2006 Lee et al. ............... 370/328
2010/0208694 A1* 8/2010 Kumai et al. ........... 370/331
2012/0046058 A1* 2/2012 Vesterinen et al. ...... 455/509

FOREIGN PATENT DOCUMENTS

WO    WO2008132163        11/2008
WO    2009028673 A1       3/2009

OTHER PUBLICATIONS

Ericsson: "On Local IP Access" 3GPP Draft; S2-093523, LIPA.PA4, 3rd Generation Partnership Project (3GPP), Sophia-Antipolis Cedex, France, Tallinn, Estonia, May 11-15, 2009, XP050346588. (4 pages).
"Index of /tsg_sa/WG2_Arch/TSGS2_73_Tallinn/Docs" pp. 1-18, XP00258191, Retrieved from the Internet: URL:http://ftp.3gpp.org/tsg_sa/WG2_Arch/TSGS2_73_Tallinn/Docs/ [retrieved on Aug. 26, 2010], Cited as proof for publication date of cited docs XP50346264 and XP50346588. (12 pages).
International Search Report and Written Opinion—PCT/US2010/034134, International Searching Authority—European Patent Office, Nov. 4, 2010.
VODAFONE: "Paging Initiation from UPE or from eNodeB?—text proposal for TR23.882" 3GPP Draft; S2-060178, 3rd Generation Partnership Project (3GPP).
Sophia-Antipolis Cedex, France, Budapest, Hungary, Jan. 16-20, 2006, XP050254542. (11 pages).
ZTE: Discussion on number of SGW and paging for LIPA HeNB: 3GPP Draft; S2-093225, 3rd Generation Partnership Project; Sophia-Antipolis, France, Tallinn, Estonia, May 11-15, 2009, XP050346317. (3 pages).
QUALCOMM Europe: "Local IP access baseline solution for EHNB" 3GPP Draft; S2-092308, 3rd Generation Partnership Project (3GPP), Mobile Competence Centre ; 650, Route Des Lucioles ; F-06921 Sophia-Antipolis Cedex ; France, no. Hangzhou; 20090324, Mar. 24, 2009, XP050345597 [retrieved on Mar. 24, 2009] the whole document.
Taiwan Search Report—TW099114862—TIPO—May 12, 2013.
European Search Report—EP12193268—Search Authority—The Hague—Aug. 29, 2013.
Alcatel-Lucent, "On HNB and HeNB interfaces for LIPA", 3GPP TSG-SA WG2 Meeting #73 S2-093378, May 5, 2009, p. 1-p. 4, URL, http://www.3gpp.org/ftp/tsg_sa/WG2_Arch/TSGS2_73_Tallinn/Docs/S2-093378.zip.

\* cited by examiner

PAGING FOR LOCAL IP ACCESS PACKETS

CLAIM OF PRIORITY

This application claims the benefit of and priority to commonly owned U.S. Provisional Patent Application No. 61/176,753, filed May 8, 2009, and assigned, the disclosure of which is hereby incorporated by reference herein.

BACKGROUND

1. Field

This application relates generally to communication and more specifically, but not exclusively, to paging an access terminal.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage to mobile units. Such small-coverage access points may be referred to as, for example, femto access points, femto cells, home NodeBs, home eNodeBs, or access point base stations. Typically, such small-coverage base stations are connected to the Internet and the mobile operator's network via a DSL router or a cable modem.

In some cases, one or more local services may accessible by a small-coverage access point. For example, an access point may be connected to a local network that supports one or more of a local computer, a local printer, a server, Internet access, or other services. In such cases, it may be desirable to enable an access terminal to access these local services via the small-coverage base station. For example, a user may wish to use his or her cell phone to access the Internet via the local network.

Conventionally, an access terminal is paged by the network when a packet destined for the access terminal arrives in the network. However, a packet destined for the access terminal from a local service may bypass the operator's network. Consequently, a need exists for effective techniques for paging an access terminal in the event a packet arrives for the access terminal from a local service.

SUMMARY

A summary of sample aspects of the disclosure follows. In the discussion herein, any reference to the term aspects may refer to one or more aspects of the disclosure.

The disclosure relates in some aspects to schemes for paging an access terminal when a packet destined for the access terminal is received via local Internet protocol (IP) access (e.g., as opposed to being received via the core network). In some aspects, local IP access may comprise access via a local area network (LAN) associated with an access point that is currently serving the access terminal.

The disclosure relates in some aspects to a scheme for obtaining information that enables paging of an access terminal when a packet destined for the access terminal is received via local IP access. For example, a local entity (e.g., an access point) that may not otherwise have the information needed to page the access terminal may acquire this information by sniffing messages passing through the local entity. This information may comprise, for example, an identifier of the access terminal and, optionally, paging timing information for the access terminal. In some aspects, such sniffing may comprise receiving a message (e.g., a non-access stratum (NAS) message), extracting the desired information from the message, and forwarding the message. Upon receiving a local IP access packet destined for the access terminal, the local entity may thus use the acquired information to page the access terminal.

The disclosure relates in some aspects to a scheme for causing the core network to page an access terminal when a local IP access packet destined for the access terminal arrives at a local entity. For example, upon receipt of such a packet, the local entity may send a packet or message to a network entity (e.g., a mobility manager or a serving gateway) to cause the network to page the access terminal. In some implementations, the local entity sends a dummy packet destined for the access terminal to the network entity to trigger paging of the access terminal. In some implementations, the local entity sends a message that explicitly requests that the access terminal be paged. In either case, the access point serving the access terminal will then receive a message from the network, whereby the message indicates that the access terminal is to be paged. The access point may then send a page message to the access terminal based on the receipt of the message from the network.

BRIEF DESCRIPTION OF THE DRAWINGS

These and other sample aspects of the disclosure will be described in the detailed description and the appended claims that follow, and in the accompanying drawings, wherein:

Figure 1:
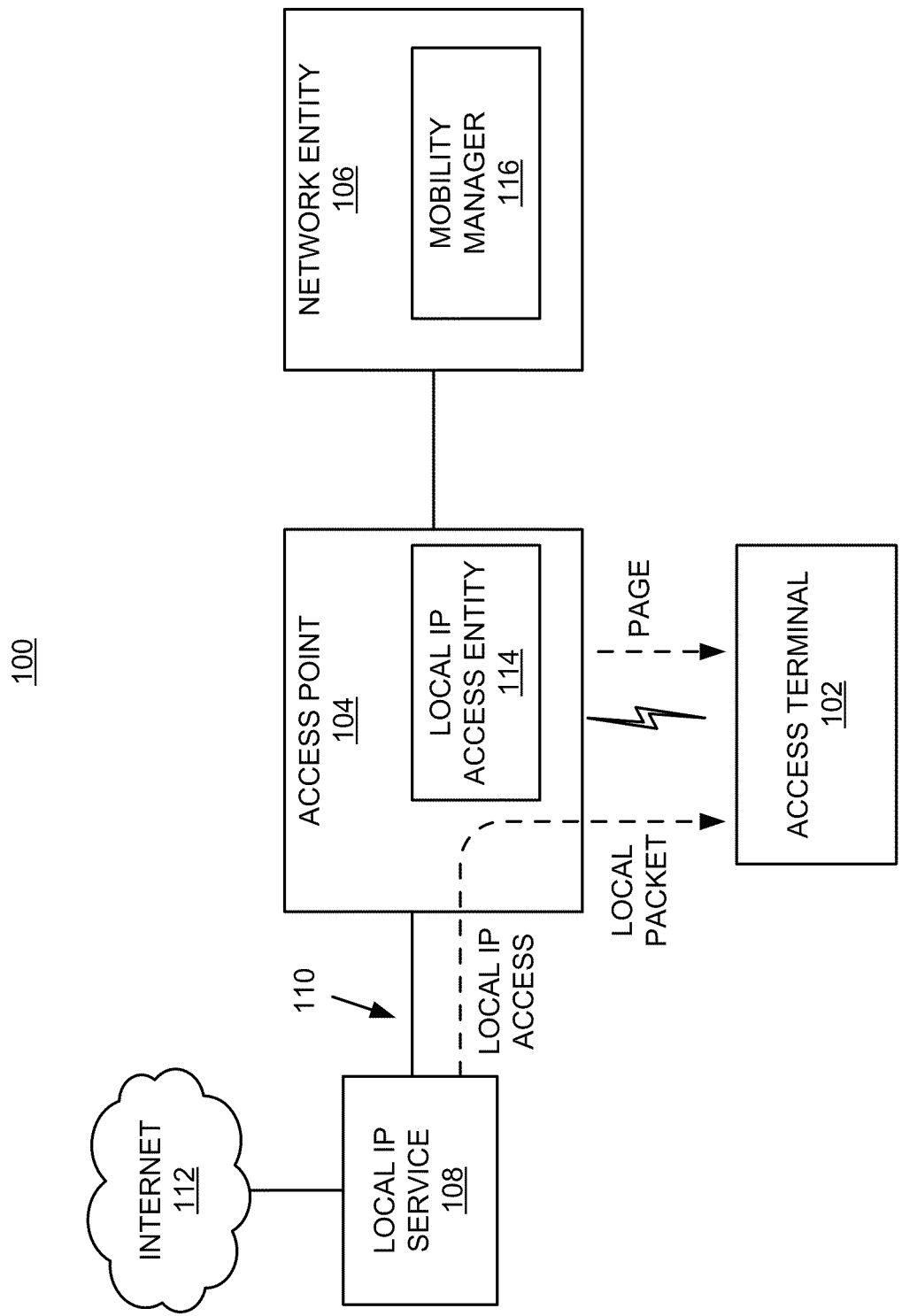
FIG. 1 is a simplified block diagram of several sample aspects of a communication system adapted to provide local IP access paging.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, Home NodeBs, eNodeBs, Home eNodeBs, and so on, while access terminals may be referred to or implemented as user equipment, mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104 or some other access point in the system 100 (not shown). Each of the access points may communicate with one or more network entities (represented, for convenience, by network entity 106) to facilitate wide area network connectivity.

These network entities may take various forms such as, for example, one or more radio and/or core network entities. Thus, in various implementations the network entity 106 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for the access terminals; and providing access control for access terminals. Also, two of more of these network entities may be co-located or distributed within the network.

In the example of FIG. 1, the access point 104 provides local IP access in addition to conventional access supplied via the core network (e.g., via the network entity 106). Thus, when the access terminal 102 is connected to the access point 104, the access terminal 102 may access one or more services (represented by local IP service 108) via the local IP access.

Local service may take various forms. In some implementations local service may relate to services provided by entities on a local network. For example, the local IP service 108 may represent a device that resides on the same IP subnetwork as the access point 104 (e.g., a local area network 110 served by a local router). In this case, accessing a local service may involve accessing a local printer, a local server, a local computer, another access terminal, or some other entity on the IP subnetwork. Advantageously, the access terminal 102 may access this local service via the access point 104 without routing traffic through the wireless operator core network (e.g., through network entity 106).

In some implementations a local service may relate to connectivity to another network (e.g., the Internet 112). For example, the local IP service 108 may provide an Internet connection to an Internet service provider ("ISP") and the access terminal 102 may use this Internet connection to access services available via the Internet (e.g., via a web server). Accordingly, through the use of local IP access, different access terminals in a network may be provided with Internet access at certain locations (e.g., a user's home, an employer's facility, an Internet hotspot, etc.) without routing traffic through the wireless operator core network.

As will be discussed in more detail below, to facilitate such local IP access, a local IP access entity 114 associated with (e.g., co-located with) the access point 104 may provide an IP point of attachment and assign an IP address for the access terminal 102. As discussed in more detail below, such a local entity may comprise, for example, a local packet data network (PDN) gateway (L-PGW) in an LTE system or, in an UMTS system, a local GGSN (L-GGSN) that may cooperate with a local SGSN (L-SGSN). In some aspects, this local entity may provide a subset of the functionality provided by the core network version of this entity (e.g., PGW in LTE and GGSN and SGSN in UMTS).

Moreover, in accordance with the teachings herein, the local IP access entity 114 and/or some other local entity may provide functionality to enable paging of the access terminal in the event a packet destined for the access terminal is received via the local IP access. For example, in one paging scheme, a local entity pages the access terminal upon receipt of a local IP access packet destined for the access terminal 102. In another paging scheme, a local entity sends a packet or message to the core network to cause the core network to page the access terminal 102.

Here, it should be appreciated that conventional paging functionality provided by the core network (e.g., by a mobility manager 116 currently associated with the access terminal 102) pages the access terminal 102 in the event a packet from the core network is destined for the access terminal 102. However, the core network may not be aware of a packet received at the access point 104 via the local IP access. Hence, the core network would not normally page the access terminal 102 for such a packet.

Sample local IP access paging operations will now be described in more detail in conjunction with the flowcharts of FIGS. 2-4. For convenience, the operations of FIGS. 2-4 (or any other operations discussed or taught herein) may be described as being performed by specific components (e.g., the components depicts in FIGS. 1 and 5-8). It should be appreciated, however, that these operations may be performed by other types of components and may be performed using a different number of components. It also should be appreciated that one or more of the operations described herein may not be employed in a given implementation.

Figure 2:
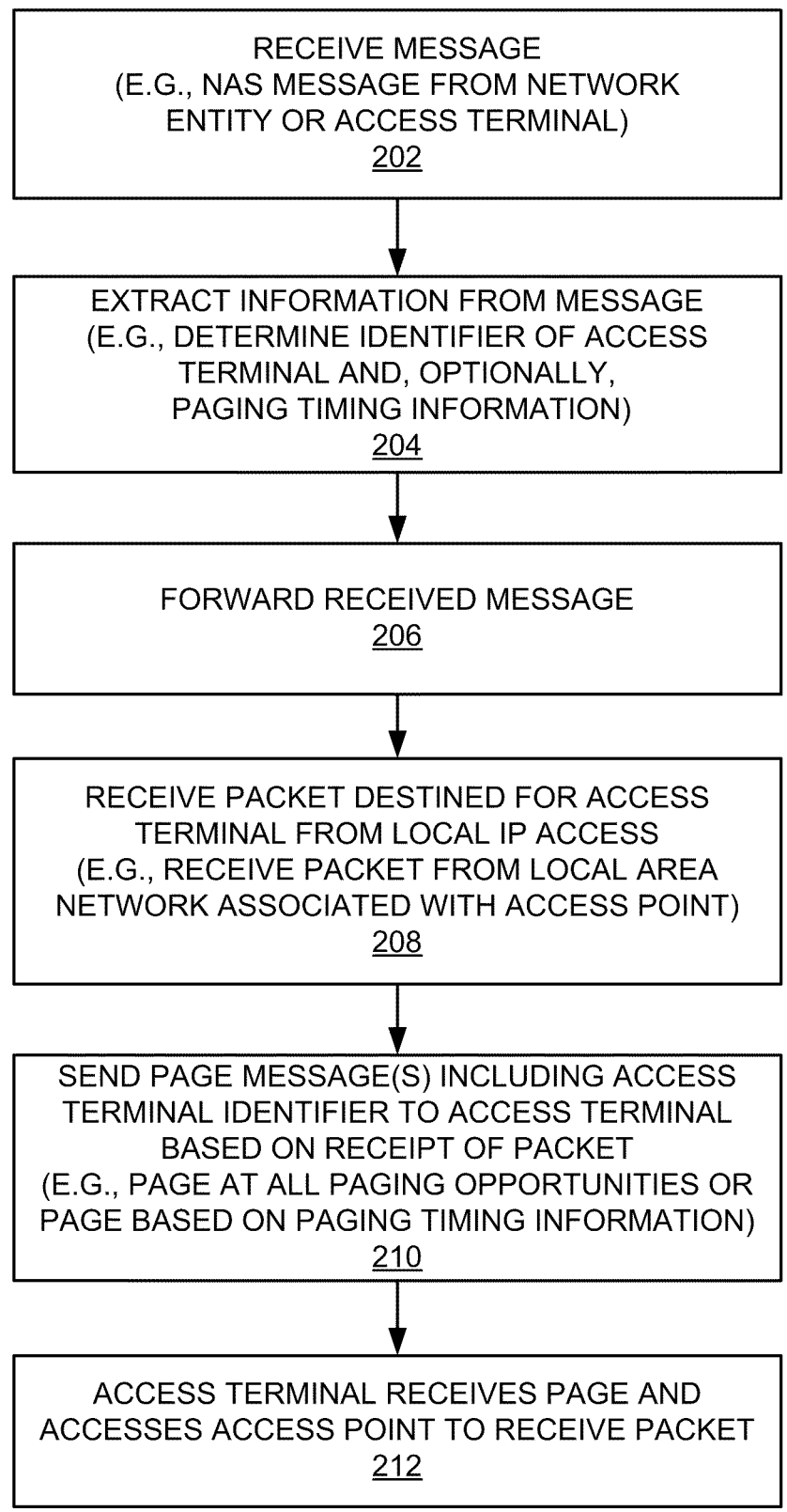
FIG. 2 is a flowchart of several sample aspects of operations that may be performed in conjunction with a local entity acquiring information to page an access terminal upon receipt of a local IP access packet.

The flowchart of FIG. 2 describes several operations that may be performed in conjunction with locally-initiated paging of an access terminal upon receipt of a local IP access packet destined for the access terminal. In some implementations, the illustrated operations are performed by an access point (e.g., by a local entity such as an L-PGW or an L-SGSN implemented within the access point) that is currently serving the access terminal. As discussed below, however, in other implementations some of the illustrated operations may be performed by a local entity (e.g., L-PGW or L-SGSN) that is not co-located with the access point that is currently serving the access terminal. For purposes of explanation, the operations of FIG. 2 will be described in the context of a local paging entity that initiates the paging (e.g., which may comprise the access point, a local gateway, or some other suitable entity).

To provide local paging, the local paging entity may need to acquire certain information. For example, a page message generally includes an identifier of the access terminal being paged. Thus, the local paging entity may need to acquire an identifier of the access terminal to include in the page message. In addition, in some implementations the local paging entity may acquire paging timing information associated with the access terminal to enable the local paging entity to send page messages at appropriate times. In the example, of FIG. 2, this information is acquired by sniffing messages that pass through the local paging entity. In particular, an example of such a sniffing operation is set forth at blocks 202-206. Blocks 208-212 then describe an example of operations that may be performed upon receipt of a local IP access packet destined for the access terminal.

As represented by block 202, at some point in time the local paging entity (e.g., the access point) receives a message that includes information that may be used to facilitate paging of the access terminal. The type of message received here may take various forms.

In some implementations, this information may be carried by non-access stratum (NAS) messages. For example, NAS messages sent from the access terminal to a mobility manager (e.g., an MME or an SGSN), and vice versa, via an access point may include this information. Examples of such NAS messages include attach messages, location area update messages, and routing area update messages.

In some implementations, this information may be carried by session management messages. For example, session management messages between the core network SGSN (or MME) and the L-GGSN or (L-PGW) for managing PDP context in UMTS (PDN connection in LTE) may include this information. Also, although NAS messages are encrypted in LTE and as such may not be sniffed by a Home eNodeB, other information such as GUTI may not be sent encrypted and could be sniffed by the Home eNodeB.

As represented by block 204, the local paging entity inspects the received message to determine the desired information (e.g., by reading the contents of the message and storing the information for later use). The desired information may take various forms.

Some of the message may include an identifier of the access terminal. For example, this identifier may consist of an international mobile subscriber identity (IMSI), a packet temporary mobile subscriber identity (P-TMSI), a globally unique temporary identifier (GUTI), or some other suitable identifier.

Some of the messages may include paging timing information associated with the access terminal. This paging timing information may indicate, for example, the periodicity at which the access terminal is to be paged. This timing information may take various forms such as, for example, discontinuous reception cycle (DRX) information, or some other suitable information.

As represented by block 206, once the desired information is extracted from the received message, the local paging entity forwards the message to the appropriate destination (e.g., the access terminal, a mobility manager, and so on). In some cases, the local paging entity may repeat the operations of blocks 202-206 (e.g., in case the paging timing information changes).

As represented by block 208, at some point in time, the local paging entity (e.g., L-PGW or L-SGSN) receives a packet destined for the access terminal from the local IP access. For example, as discussed above, an access point at which an access terminal is currently camped (e.g., in idle mode) may receive a packet destined for that access terminal via a LAN connected to the access point.

As represented by block 210, based on the receipt of the packet, the local paging entity sends at least one page message to the access terminal. Here, the local paging entity may use the information acquired at block 204 to issue the page message(s). For example, the page message may include the acquired access terminal identifier. In various implementations, different techniques may then be employed to determine when to page the access terminal.

In some implementations, the local paging entity sends a page message based on the acquired paging timing information. For example, the paging timing information may define specific timing for paging indications in a paging indicator channel and page messages in a paging channel (e.g., the information may comprise the DRX assigned to the access terminal). In this case, the local paging entity sets the paging indications and sends the page messages at the points in time that the access terminal is configured to wake up from idle mode to monitor for page indications and page messages.

In other implementations, based on the receipt of the packet at block 208, the local paging entity may page the access terminal at all paging occasions in the paging channel, and set all paging indicators in the paging indicator channel to indicate that a page is available (e.g., set all paging indicators to "1"). In this way, whenever the access terminal wakes up to monitor for a paging indicator, the access terminal will see that its paging indicator is set. Hence, the access terminal will monitor for a page message in the paging channel at the next designated paging occasion (paging opportunity). The access terminal will therefore receive the page message since the page message is sent at each paging opportunity in the paging channel.

As represented by block 212, once the access terminal receives the page message, the access terminal may access its serving access point to initiate transfer of the packet from the access point. As discussed above, this access point may include the local paging entity or may be in communication with the local paging entity.

Figure 3:
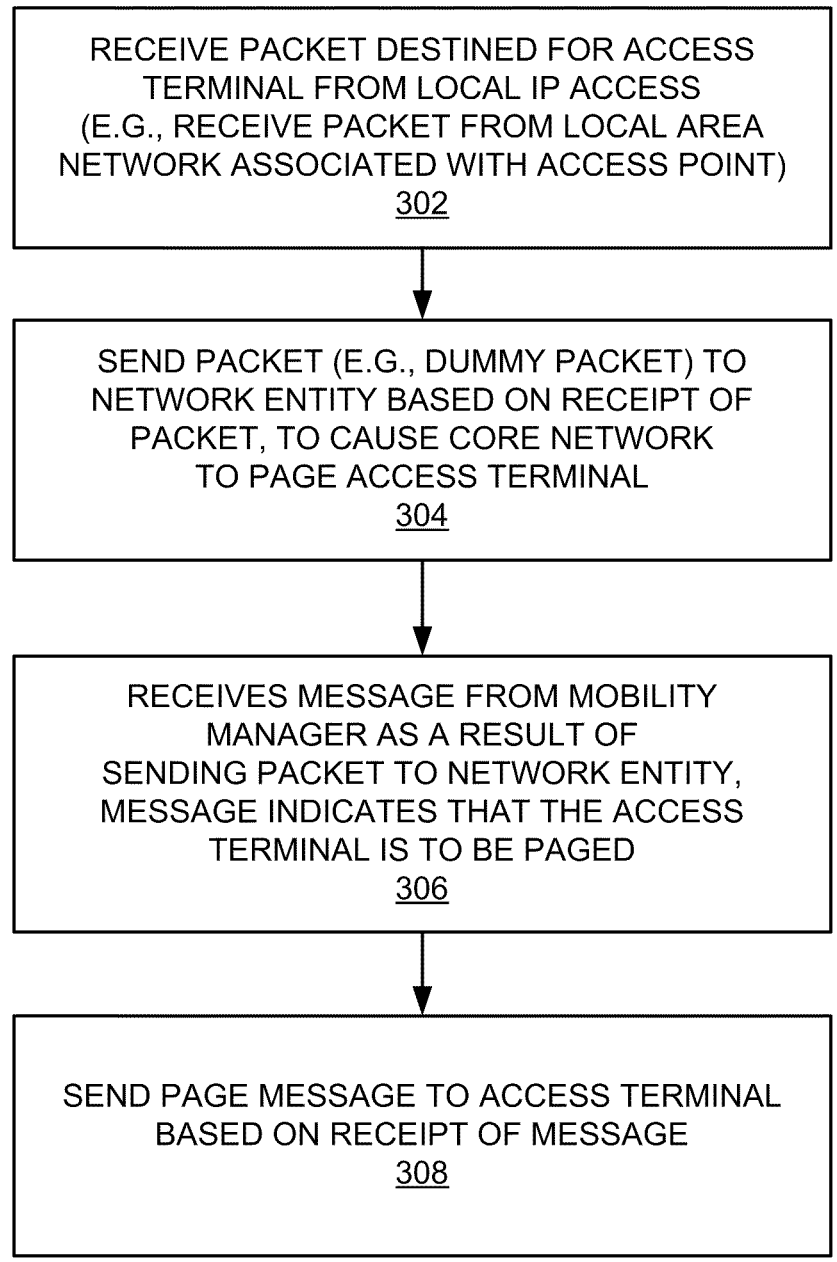
FIG. 3 is a flowchart of several sample aspects of operations that may be performed in conjunction with a local entity sending a packet to cause the network to page an access terminal.

The flowchart of FIG. 3 describes several operations that may be performed in conjunction with a local entity causing the core network to page an access terminal. For example, upon receipt of a local IP access packet destined for the access terminal, a local entity (e.g., L-PGW or L-SGSN) may send a packet destined for the access terminal to the core network. Upon receiving this packet, the core network initiates paging of the access terminal.

As represented by block 302, at some point in time, a local entity (e.g., L-PGW or L-SGSN) receives a packet destined for the access terminal from the local IP access. For example, as discussed above, an access point at which an access terminal is currently camped (e.g., in idle mode) may receive a packet destined for that access terminal via a LAN connected to the access point.

As represented by block 304, based on the receipt of the packet at block 302, the local entity sends a packet to a network entity (e.g., to a mobility manager or to a serving gateway) to cause the network to page the access terminal. Here the packet being sent is destined for the access terminal (e.g., the destination address specified by the packet is the access terminal). Thus, upon receiving the packet, the core network (e.g., the mobility manager) may initiate paging of the access terminal.

The packet sent to the network entity may take various forms. In some implementations the packet may comprise a data packet. In some implementations the packet may comprise a control packet. In some implementations the packet may comprise a so-called dummy packet that does not include any data or other information to be used by the access terminal. For example, a dummy packet may include the address of the access terminal in the destination address field of the packet header. However, the packet may not include any other data/information. Alternatively, the packet may include data/information that is intended to be ignored by the access terminal.

The packet may be sent to the network entity in various ways. In some implementations, the packet is sent via the local IP access through the Internet to the core network (e.g., to a mobility manager or to a serving gateway). The packet also may be sent from the local entity directly to the core network (e.g., from the L-GGSN to a mobility manager such as the SGSN) if the implementation supports this type of packet flow. In some implementations, the packet may be sent via a protocol tunnel such as a GPRS tunneling protocol (GTP) tunnel.

As mentioned above, upon receiving a packet destined for the access terminal, the core network will send a message that indicates that the access terminal is to be paged. Thus, as represented by block 306, the local entity will receive a message from a network entity as a result of sending the packet at block 304.

As represented by block 308, the local entity will thus send a page message to the access terminal based on the receipt of the message at block 306. Once the access terminal receives the page message, the access terminal may access its serving access point (e.g., which may include the local entity or which may be in communication with the local entity). The access point may then send the local IP access packet to the access terminal.

Figure 4:
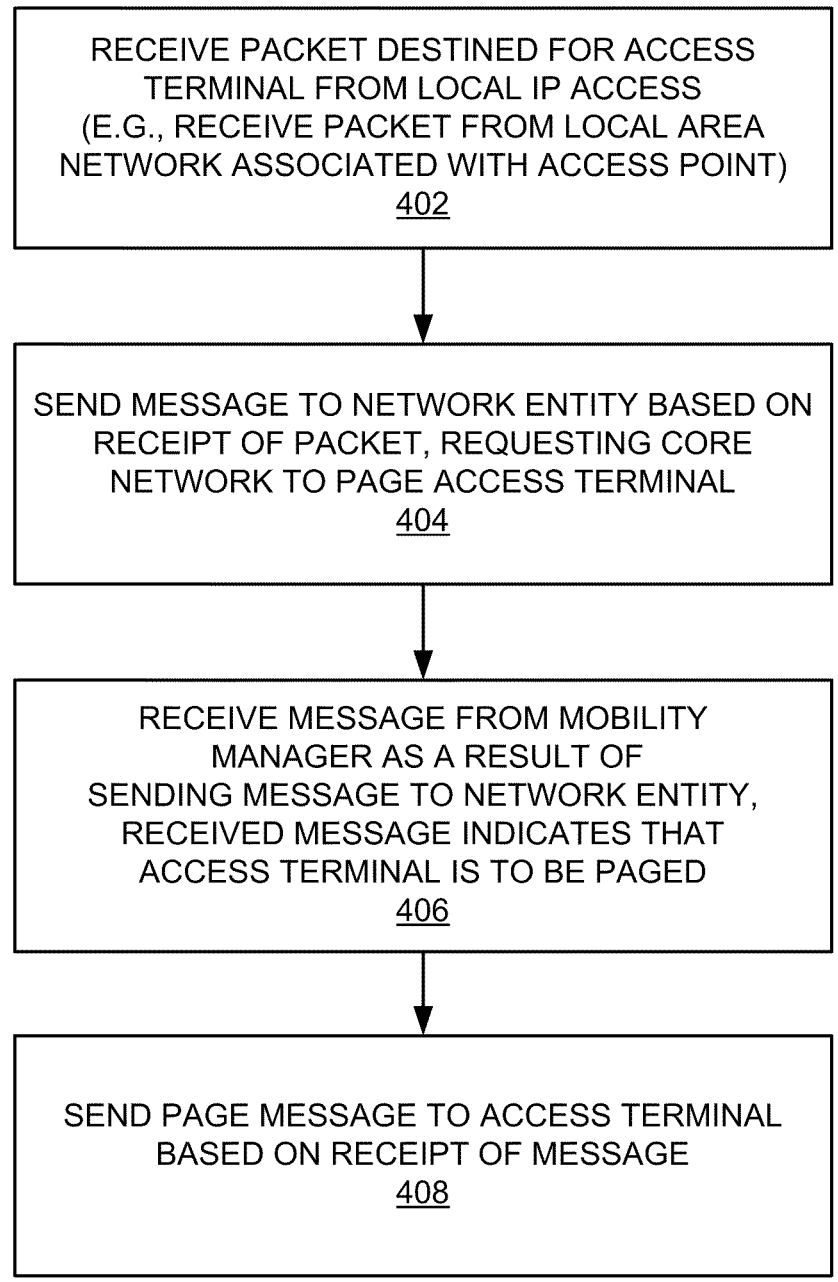
FIG. 4 is a flowchart of several sample aspects of operations that may be performed in conjunction with a local entity sending a message requesting that the network page an access terminal.

The flowchart of FIG. 4 describes several operations that may be performed in conjunction with a local entity requesting the core network to page an access terminal. For example, upon receipt of a local IP access packet destined for the access terminal, a local entity (e.g., L-PGW or L-SGSN) may send a message to the core network, whereby the message explicitly requests the core network to page the access terminal.

As represented by block 402, at some point in time, a local entity (e.g., L-PGW or L-SGSN) receives a packet destined for the access terminal from the local IP access. For example, as discussed above, an access point at which an access terminal is currently camped (e.g., in idle mode) may receive a packet destined for that access terminal via a LAN connected to the access point.

As represented by block 404, based on the receipt of the packet at block 402, the local entity sends a message to a network entity requesting the network to page the access terminal. Here, the network entity may comprise, for example, a mobility manager (e.g., an MME or SGSN) or a serving gateway (e.g., SGW). The message may include an identifier of the access terminal and an indication that the access terminal is to be paged (e.g., for local IP access). In some implementations, this message may comprise a radio access network application part (RANAP) message (e.g., a new message defined for this purpose or an old message adapted for this purpose).

The message may be sent to the network entity in various ways. In some implementations, the message may be sent from the local entity directly to the core network (e.g., to a mobility manager). Alternatively, the message may be sent via the local IP access through the Internet to the core network.

Upon receiving a request to page the access terminal, the core network (e.g., the mobility manager) may initiate paging by sending a message that indicates that the access terminal is to be paged. Thus, as represented by block 406, the local entity will receive a message from a network entity as a result of sending the packet at block 404.

As represented by block 408, the local entity will thus send a page message to the access terminal based on the receipt of the message at block 406. Once the access terminal receives the page message, the access terminal may access its serving access point (e.g., which may include the local entity or which may be in communication with the local entity). The access point may then send the local IP access packet to the access terminal.

It should be appreciated that the teachings herein may be implemented in various types of networks. For example, in some aspects functionality provided in an LTE system by mobility management entity (MME) and/or a serving gateway (SGW) may be provided in a UMTS system by a mobile switching center/visitor location register (MSC/VLR) and/or a serving GPRS support node (SGSN). Also, in some aspects functionality provided in an LTE system by a PGW may be provided in a UMTS system by a gateway GPRS support node (GGSN). For purposes of illustration, various aspects of the disclosure will now be described in the context of a UMTS-based network in FIG. 5 and an LTE-based network in FIG. 6.

Figure 5:
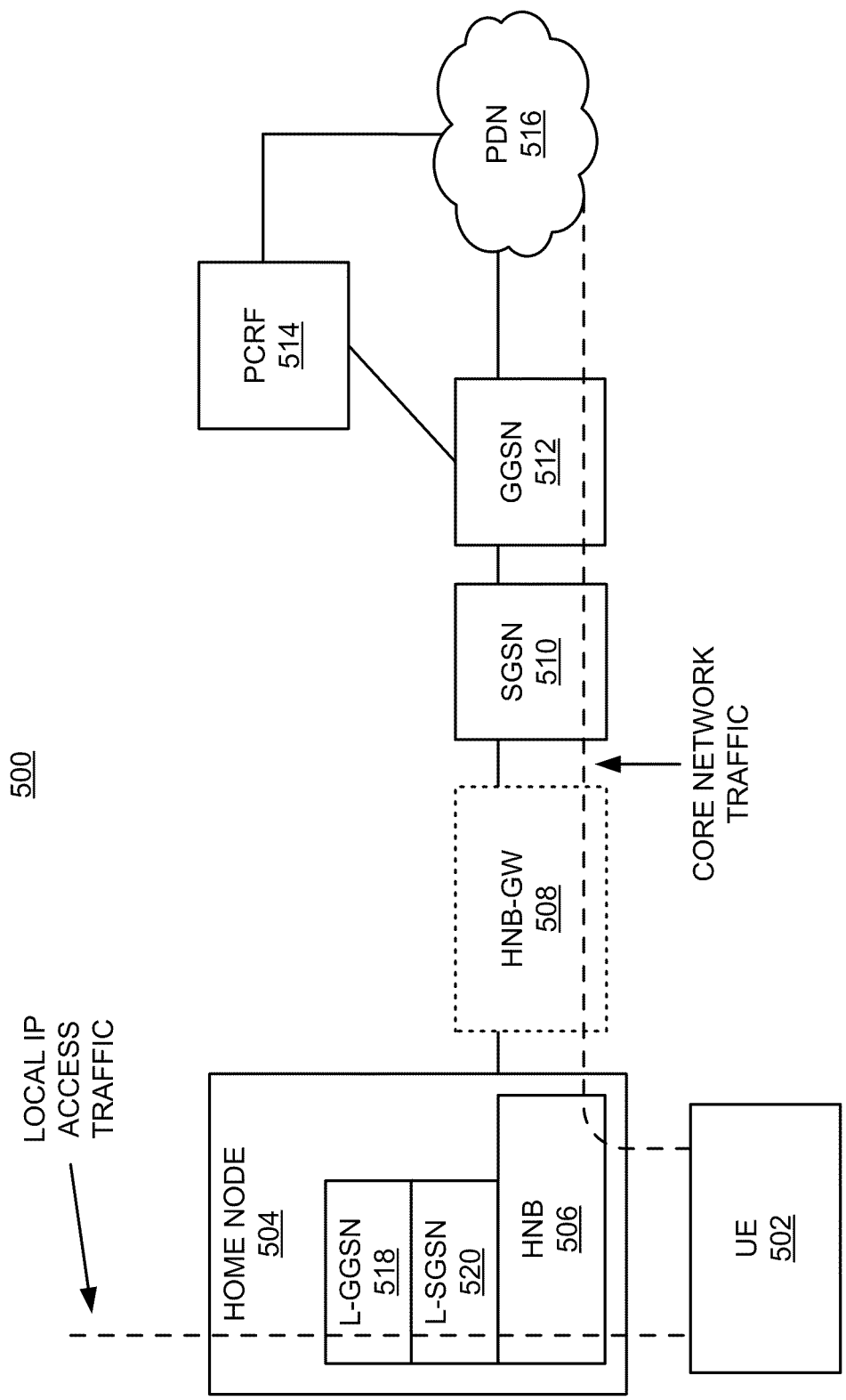
FIG. 5 is a simplified block diagram of several sample aspects of a UMTS network adapted to provide local IP access paging.

FIG. 5 illustrates sample components that may be employed in a UMTS-based network 500 to provide local paging functionality as taught herein. In this example, a home node 504 (e.g., an access point) includes a Home NodeB (HNB) 506 and local entities L-GGSN 518 and L-SGSN 520 that support local IP access.

User equipment (UE) 502 communicates via wireless signals with the HNB 506 (e.g., via UTRA protocol). The HNB 506 communicates with the core network via a SGSN 510. In some implementations, HNBs may be connected to the core network components via one or more gateways (HNB-GWs). Accordingly, an optional HNB-GW 508 is represented in phantom between the HNB 506 and the SGSN 510. The SGSN 510 communicates with a GGSN 512 which, in turn, communicates with a policy and charging resource function (PCRF) 514 and packet data network (PDN) 516 (e.g., the Internet, an intranet, intra-operator IMS provisioning).

As discussed above, the L-GGSN 518 provides an IP point of attachment and assigns an IP address for the UE 502. Thus, in some aspects, the L-GGSN 518 provides a subset of the functionality of the GGSN 512 for local access. In some aspects, the L-SGSN 520 provides PDN connectivity establishment for local IP access, bearer establishment for the local IP PDN connection, and supports local session management procedures for local IP access. The L-SGSN 520 may handle NAS messages from the UE 502 relating to local IP access and forward all UE NAS messages to the SGSN 510. Thus, in some aspects, the L-SGSN 520 provides a subset of the functionality of the SGSN 510 for local access.

In the implementation of FIG. 2, the L-SGSN 520 may sniff messages (e.g., NAS messages) passing through the L-SGSN 520 to obtain any information needed to page the UE 502. In addition, a local IP access packet is received at the L-GGSN 518 and then forwarded to the L-SGSN 520. The L-SGSN 520 may then initiate paging of the UE 502 by, for example, sending a page message to the UE 502 via the HNB 506. In implementations that do not include an L-SGSN, the HNB 506 may be configured to do the sniffing and paging.

In the implementations of FIGS. 3 and 4, a local IP access packet is received at the L-GGSN 518 and then forwarded to the L-SGSN 520. The L-SGSN 520 may then send a packet to the SGSN 510 or GGSN 512 (or send a request message to the SGSN 510) to initiate paging of the UE 502. The SGSN 510 may then send a message to the HNB 506 indicating that the UE 502 needs to be paged (e.g., the L-SGSN 510 issues a page to the local radio network controller (RNC) of the HNB 506). In response, the HNB 506 may then send a page message to the UE 502.

In implementations where the HNB supports circuit switch (CS) traffic, the UE may be paged from the CS domain using a CS-specific DRX (DRXcs). As above, the local entity (e.g., HNB) may sniff NAS messages to collect an access terminal identifier (e.g., P-TMSI). Different paging messages may then be employed depending on whether the UE is in idle mode or connected mode. If the UE is in idle mode (RRC-CS does not exist), a type 1 paging message may be issued (e.g., including P-TMSI, paging originator=SGSN, packet switch (PS) domain). If the UE is in connected mode (RRC-CS exists), a type 2 paging message may be issued (e.g., including P-TMSI, routing area, PS domain).

Figure 6:
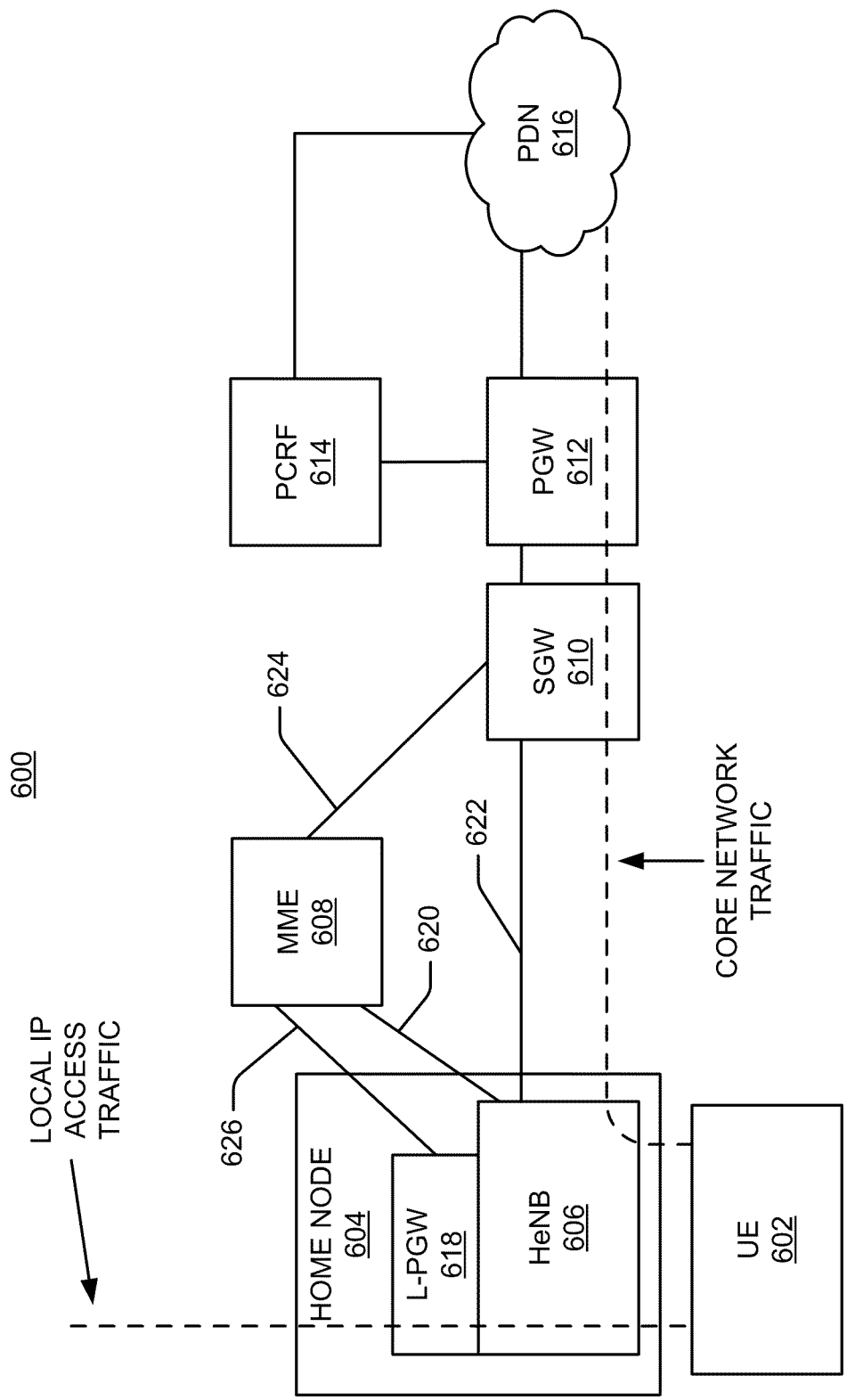
FIG. 6 is a simplified block diagram of several sample aspects of an LTE network adapted to provide local IP access paging.

FIG. 6 illustrates sample components that may be employed in an LTE-based network 600 to provide functionality as taught herein. In this example, a home node 604 (e.g., an access point) includes a Home eNodeB (HeNB) 606 and a local entity L-PGW 618 that supports local IP access.

User equipment (UE) 602 communicates via wireless signals with the HeNB 606 (e.g., via E-UTRA protocol). The HeNB 606 communicates with an MME 608 via an S1-MME protocol as represented by line 620. The HeNB 606 may communicate with an SGW 610 via an S1-U protocol as indicated by line 622. The MME 606 also communicates with the SGW 610 via an S11 protocol as indicated by line 624. The SGW 610 communicates with a PGW 612, and the PGW 612 communicates with a PCRF 614 and PDN 516.

As discussed above, the L-PGW 618 provides an IP point of attachment and assigns an IP address for the UE 602. Here, since NAS signaling is encrypted, the HeNB 606 cannot proxy MME functionality over conventional interfaces. Thus, as represented by line 626, a subset of the S11 protocol interface (represented by line 620) is provided between the MME 608 and the L-PGW 618 (e.g., to enable PDN connectivity and bearer setup). Accordingly, the L-PGW 618 may forward local IP access traffic and support local session management for local IP access. Thus, in some aspects, the L-PGW 618 provides a subset of the functionality of the PGW 612 for local access.

In the implementation of FIG. 2, the HeNB 606 may sniff message passing through the HeNB 606 to obtain any information needed to page the UE 602. The HeNB 606 may then pass this information to the L-PGW 618. When a local IP access packet is received at the L-PGW 618, the L-PGW 618 may thereby initiate paging of the UE 602 by, for example, sending a page message to the UE 602 via the HeNB 606.

In the implementations of FIGS. 3 and 4, when a local IP access packet is received at the L-PGW 618, the L-PGW 618 may send a packet to the MME 610 or to the SGW 610 (or send a request message to the MME 608) to initiate paging of the UE 602. The MME 608 may then send a message to the HeNB 606 indicating that the UE 602 needs to be paged, whereupon the HeNB 606 sends a page message to the UE 602.

Figure 7:
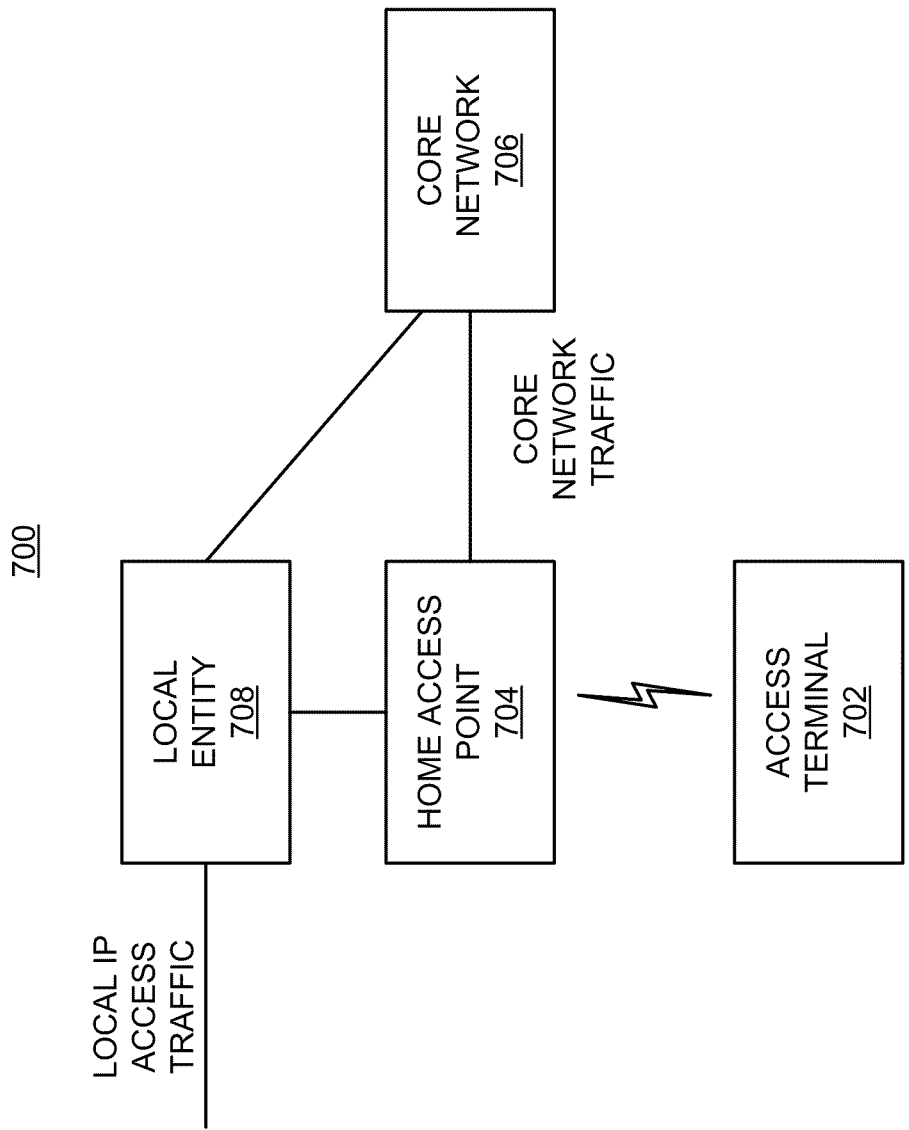
FIG. 7 is a simplified block diagram of several sample aspects of a communication system where a local entity separate from an access point supports local IP access paging.

As mentioned above, functionality for supporting local IP access may be co-located with an access point (e.g., HNB or HeNB) or may be located elsewhere. FIG. 7 illustrates an example of a system 700 where a local entity 708 (e.g., a local gateway) that support local IP access is not co-located with a home access point 704. Here, downlink local IP access traffic may flow from the local entity 708 through the home access point 704 to the access terminal 702 in this example. Conversely, downlink core network traffic may flow from the core network 706 through the home access point 704 to the access terminal 702. For example, in an LTE system the local entity 708 may comprise an L-PGW, the home access point 704 may comprise a HeNB, and the core network 706 may comprise an MME and SGW, whereby the L-PGW may communicate with the MME or SGW (e.g., sends a dummy packet) for local IP access. Similarly, in a UMTS system, the local entity 708 may comprise an L-GGSN and an L-SGSN, the home access point 704 may comprise a HNB, and the core network 706 may comprise a SGSN and GGSN.

Figure 8:
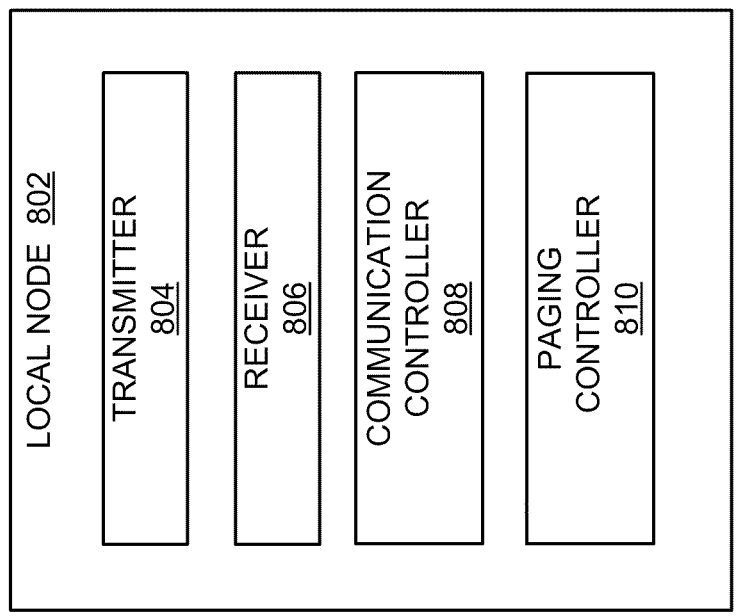
FIG. 8 is a simplified block diagram of several sample aspects of components that may be employed in communication nodes.

FIG. 8 illustrates several sample components that may be incorporated into a local node (e.g., the access point 104 or the local gateway 708) to perform local IP access paging operations as taught herein. The described components also may be incorporated into other nodes in a communication system. For example, other nodes in a system may include components similar to those described for the local node 802 to provide similar functionality. A given node may contain one or more of the described components. For example, an access point may contain multiple transceiver components that enable the access terminal to operate on multiple frequencies and/or communicate via different technologies.

As shown in FIG. 8, the local node 802 includes a transmitter 804 for sending signals (e.g., messages and packets) and a receiver 806 for receiving signals. In addition, the local node 802 may include a communication controller 808 for managing communication with other nodes (e.g., sending and receiving messages/packets) and for providing other related functionality as taught herein. In some implementations this communication controller functionality may be incorporated into the transmitter 804 and/or the receiver 806. The local node 802 also includes a paging controller 810 for providing local IP access paging-related operations (e.g., determining access terminal identifiers and paging timing information, sending page messages, setting paging indicators, sending packets (e.g., dummy packets) or messages based on the receipt of a packet destined for an access terminal) and for providing other related functionality as taught herein.

In some implementations, the components of FIG. 8 may be implemented in one or more processors (e.g., that uses and/or incorporates data memory for storing information or code used by the processor(s) to provide this functionality). For example, the functionality of blocks 808 and 810 may be implemented by a processor or processors of the local node 802 and data memory of the local node 802 (e.g., by execution of appropriate code and/or by appropriate configuration of processor components).

In some aspects, the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
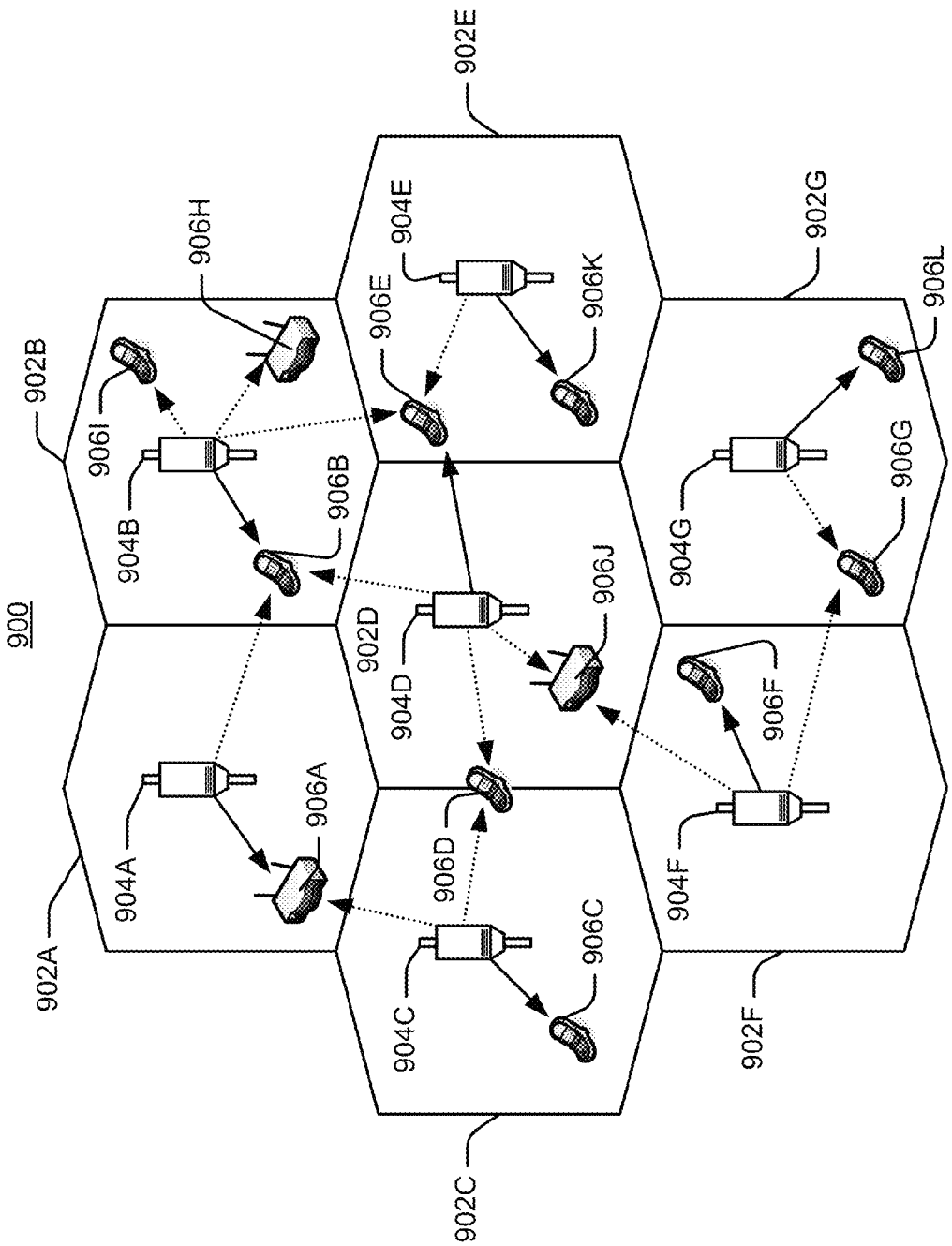
FIG. 9 is a simplified diagram of a wireless communication system.

FIG. 9 illustrates a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a neighborhood or several miles in rural environment.

Figure 10:
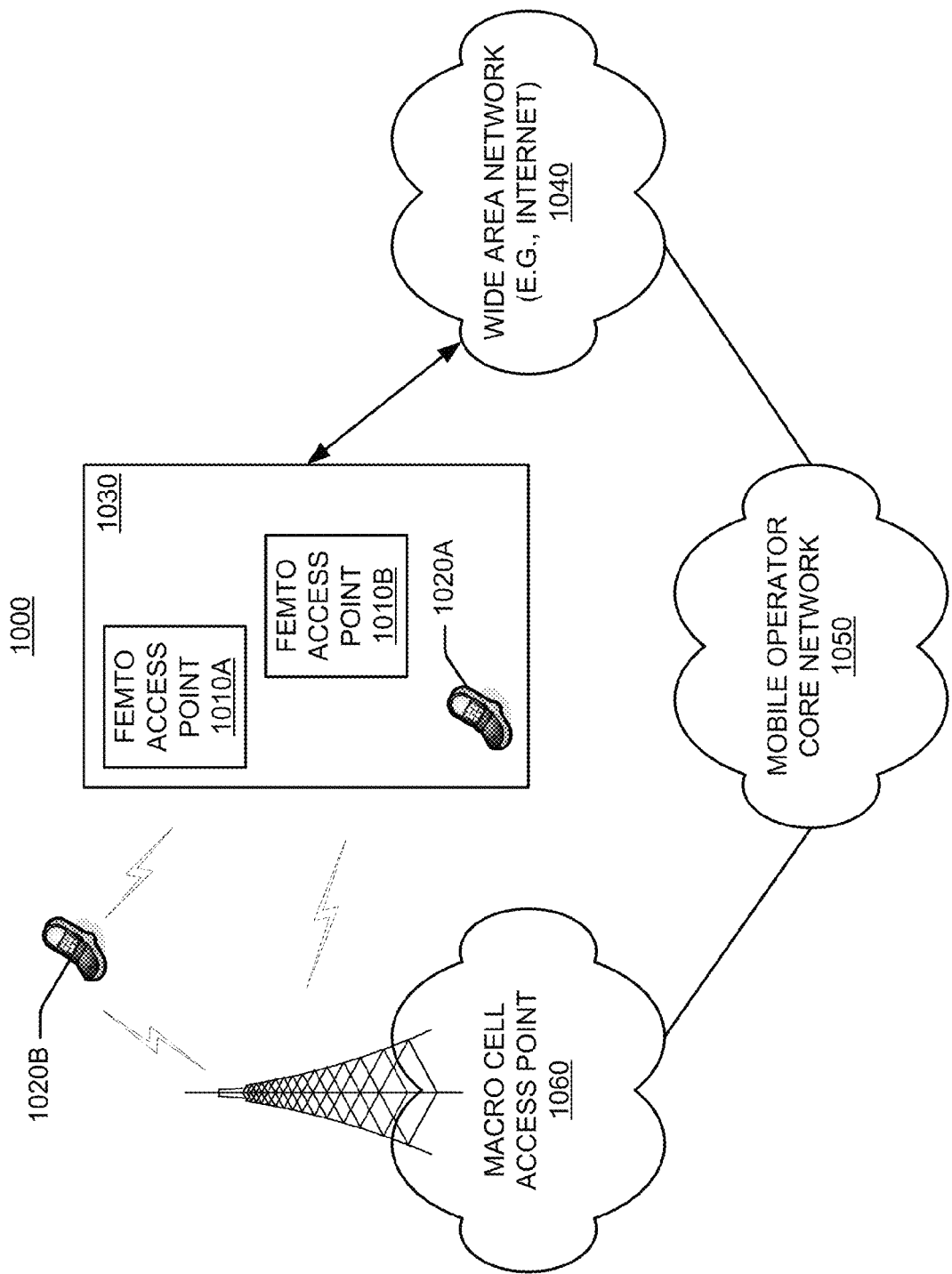
FIG. 10 is a simplified diagram of a wireless communication system including femto nodes.

FIG. 10 illustrates an exemplary communication system 1000 where one or more femto access points are deployed within a network environment. Specifically, the system 1000 includes multiple femto access points 1010 (e.g., femto access points 1010A and 1010B) installed in a relatively small scale network environment (e.g., in one or more user residences 1030). Each femto access point 1010 may be coupled to a wide area network 1040 (e.g., the Internet) and a mobile operator core network 1050 via a DSL router, a cable modem, a wireless link, or other connectivity means (not shown). As will be discussed below, each femto access point 1010 may be configured to serve associated access terminals 1020 (e.g., access terminal 1020A) and, optionally, other (e.g., hybrid or alien) access terminals 1020 (e.g., access terminal 1020B). In other words, access to femto access points 1010 may be restricted whereby a given access terminal 1020 may be served by a set of designated (e.g., home) femto access point(s) 1010 but may not be served by any non-designated femto access points 1010 (e.g., a neighbor's femto access point 1010).

Figure 11:
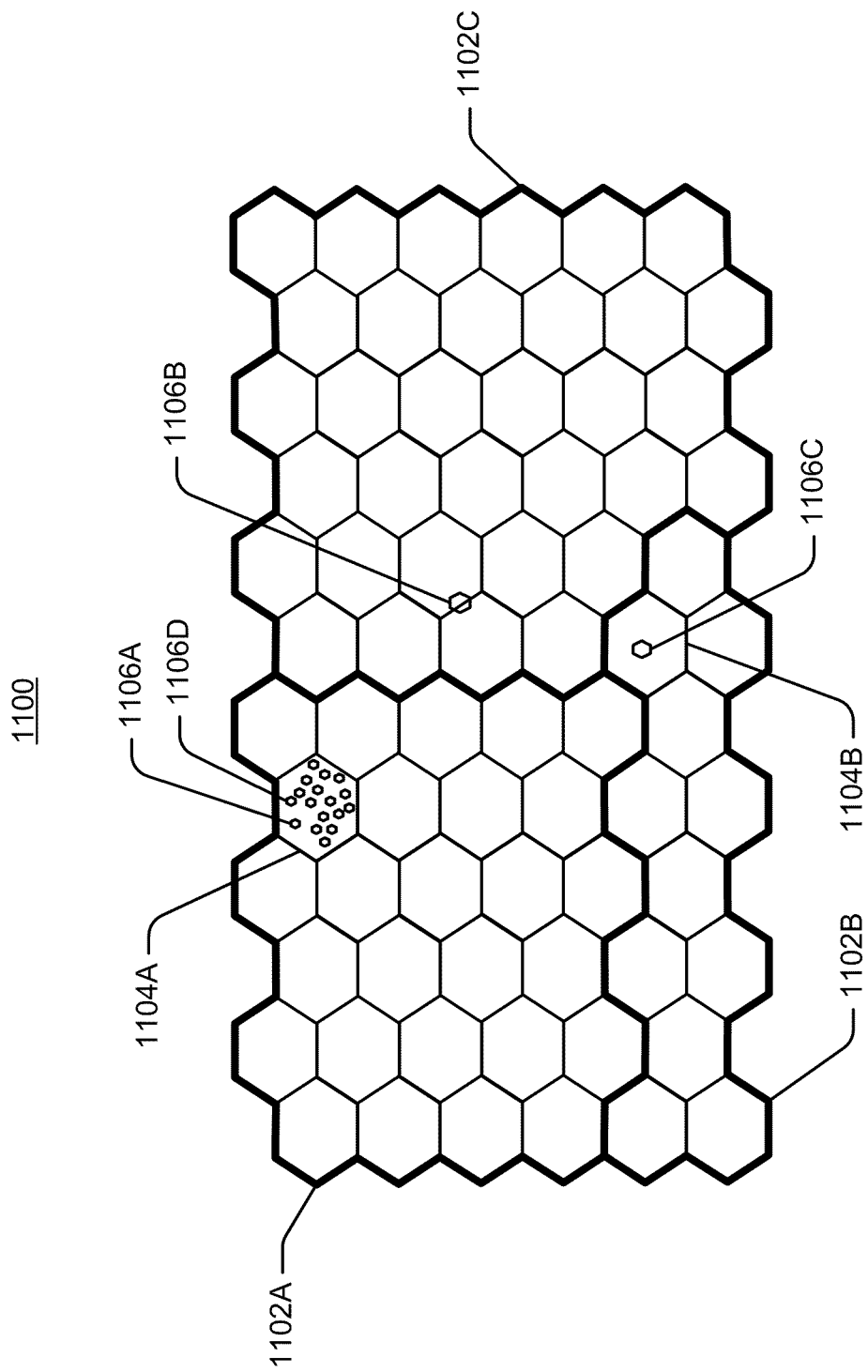
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 may not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 10, the owner of a femto access point 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto access points 1010 (e.g., the femto access points 1010A and 1010B that reside within a corresponding user residence 1030). For example, when a subscriber is outside his home, he is served by a standard macro access point (e.g., access point 1060) and when the subscriber is at home, he is served by a femto access point (e.g., access point 1010A). Here, a femto access point 1010 may be backward compatible with legacy access terminals 1020.

A femto access point 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto access point (e.g., the home femto access point of the access terminal 1020) whenever such connectivity is possible. For example, whenever the access terminal 1020A is within the user's residence 1030, it may be desired that the access terminal 1020A communicate only with the home femto access point 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred femto access point 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1010, the access terminal 1020 selects the femto access point 1010 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1010 that reside within the corresponding user residence 1030). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
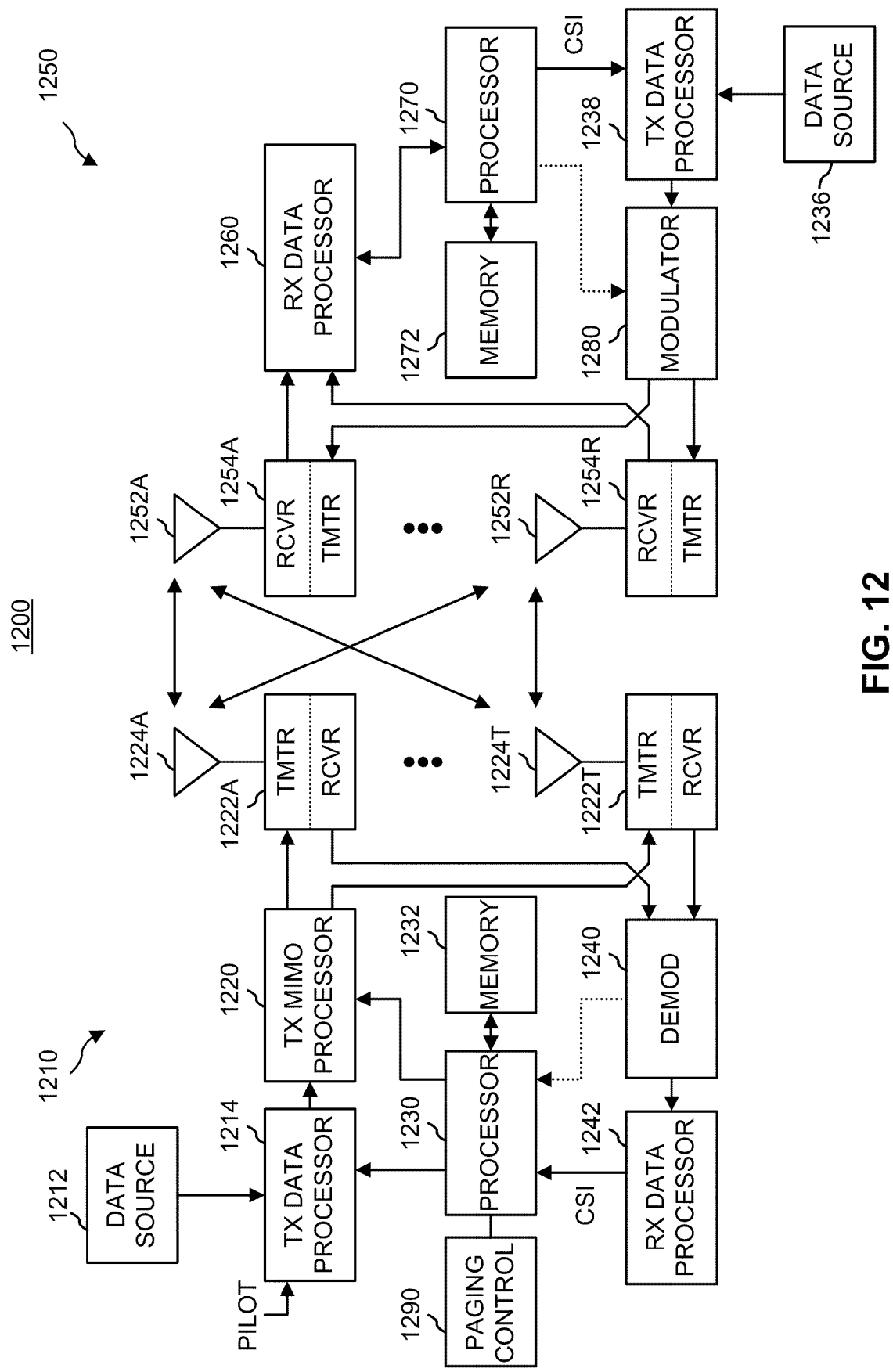
FIG. 12 is a simplified block diagram of several sample aspects of communication components.

FIG. 12 illustrates a wireless device 1210 (e.g., an access point) and a wireless device 1250 (e.g., an access terminal) of a sample MIMO system 1200. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beamforming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform paging control operations as taught herein. For example, a paging control component 1290 may cooperate with the processor 1230 and/or other components of the device 1210 to facilitate paging of another device (e.g., device 1250) as taught herein. It should be appreciated that for each device 1210 and 1250 the functionality of two or more of the described components may be provided by a single component. For example, a single processing component may provide the functionality of the paging control component 1290 and the processor 1230.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re1O, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 13:
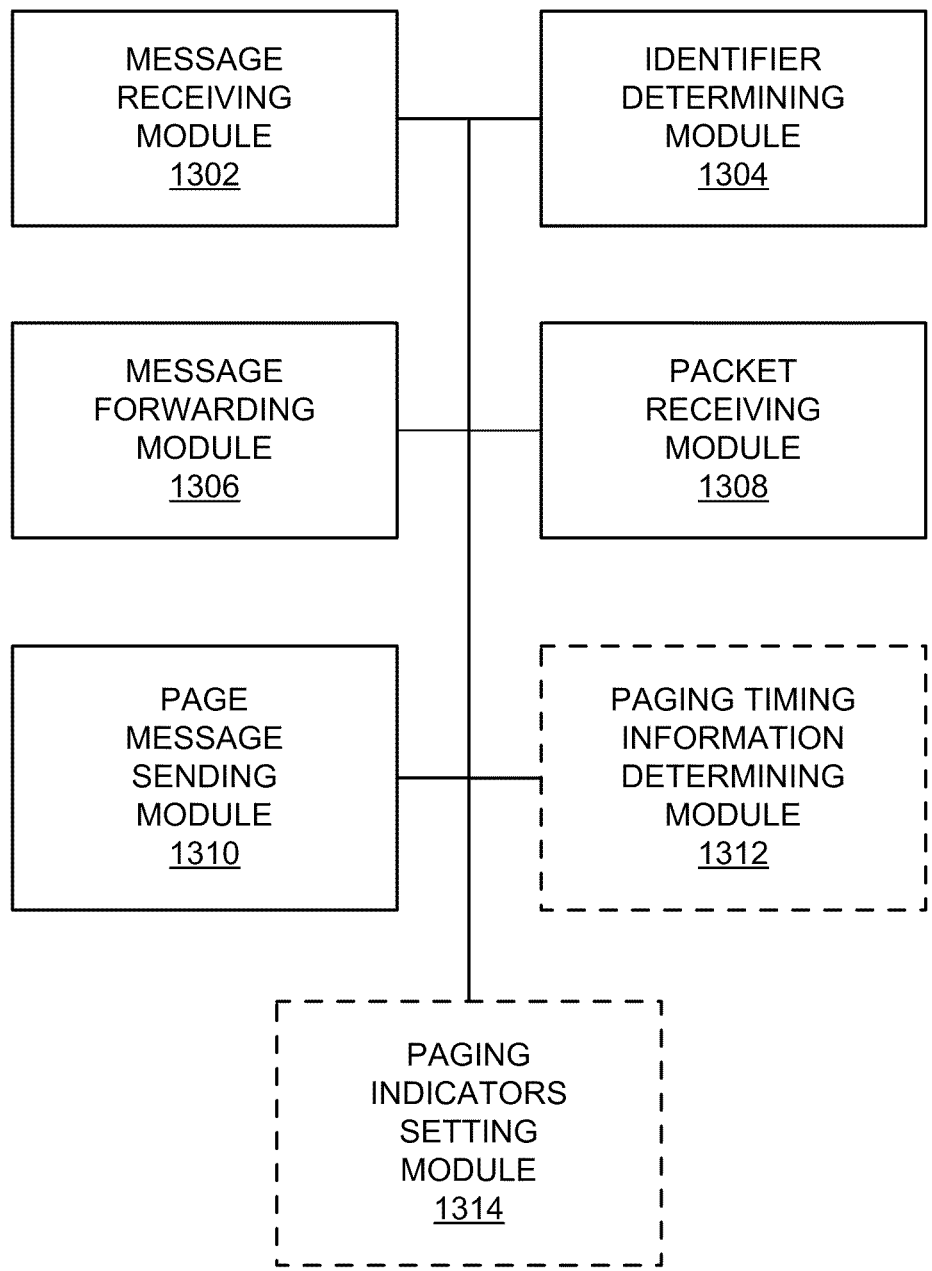
FIGS. 13-15 are simplified block diagrams of several sample aspects of apparatuses configured to provide local IP access packet paging as taught herein.
Figure 14:
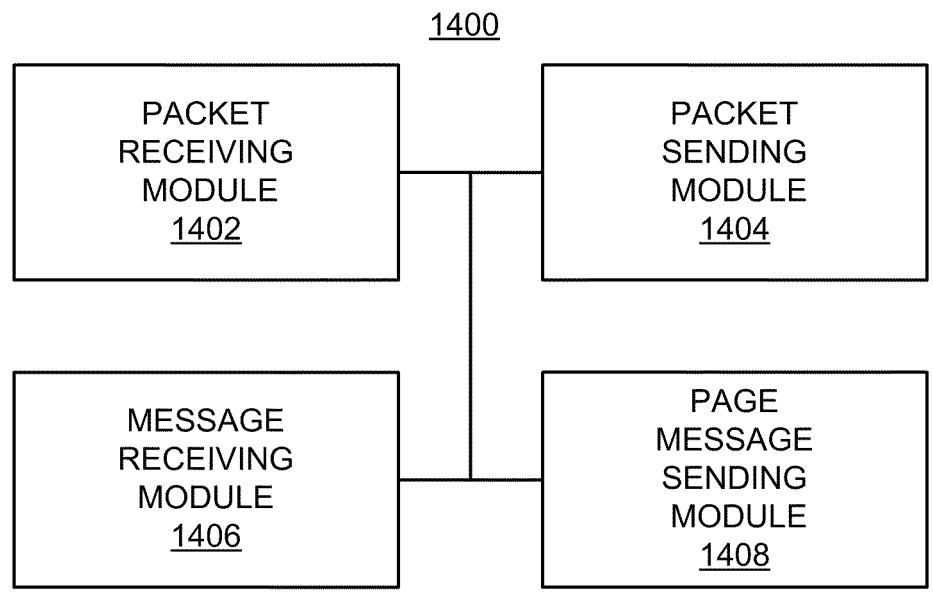
Figure 15:
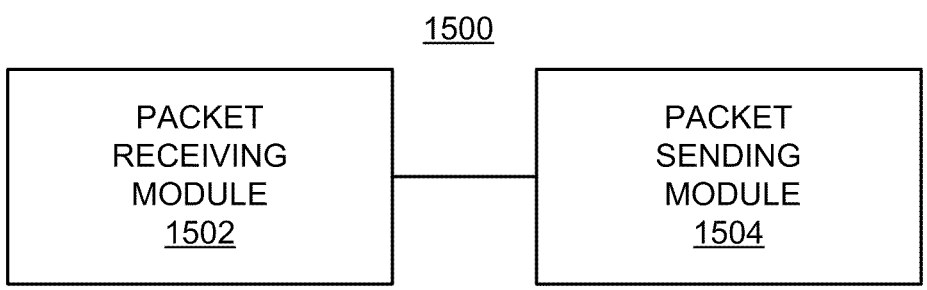

The functionality described herein (e.g., with regard to one or more of the accompanying figures) may correspond in some aspects to similarly designated "means for" functionality in the appended claims. Referring to FIGS. 13-15, apparatuses 1300, 1400, and 1500 are represented as a series of interrelated functional modules. Here, a message receiving module 1302 may correspond at least in some aspects to, for example, a receiver as discussed herein. An identifier determining module 1304 may correspond at least in some aspects to, for example, a paging controller as discussed herein. A message forwarding module 1306 may correspond at least in some aspects to, for example, a transmitter as discussed herein. A packet receiving module 1308 may correspond at least in some aspects to, for example, a receiver as discussed herein. A page message sending module 1310 may correspond at least in some aspects to, for example, a paging controller as discussed herein. A paging timing information determining module 1312 may correspond at least in some aspects to, for example, a paging controller as discussed herein. A paging indicators setting module 1314 may correspond at least in some aspects to, for example, a paging controller as discussed herein. A packet receiving module 1402 may correspond at least in some aspects to, for example, a receiver as discussed herein. A packet sending module 1404 may correspond at least in some aspects to, for example, a paging controller as discussed herein. A message receiving module 1406 may correspond at least in some aspects to, for example, a receiver as discussed herein. A page message sending module 1408 may correspond at least in some aspects to, for example, a paging controller as discussed herein. A packet receiving module 1502 may correspond at least in some aspects to, for example, a receiver as discussed herein. A packet sending module 1504 may correspond at least in some aspects to, for example, a paging controller as discussed herein.

The functionality of the modules of FIGS. 13-15 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 13-15 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving a message;
   determining an identifier of an access terminal from the message;
   forwarding the message;
   receiving a packet destined for the access terminal;
   setting all paging indicators in a paging indicator channel based on the receipt of the packet; and
   sending at least one page message to the access terminal based on the receipt of the packet, wherein the at least one page message comprises the identifier determined from the message, and wherein sending the at least one page message comprises sending one or more page messages to the access terminal at each paging opportunity in a paging channel.

2. The method of claim 1, wherein the packet is received from a local area network associated with an access point that sends the at least one page message.

3. The method of claim 2, wherein the at least one page message is sent by a local serving GPRS support node at the access point.

4. The method of claim 1, wherein the message comprises a non-access stratum message.

5. The method of claim 4, wherein the non-access stratum message comprises an attach message, a location area update message, or a routing area update message.

6. The method of claim 1, wherein the message is received from a mobility manager for the access terminal.

7. The method of claim 6, wherein the mobility manager comprise a core network serving GPRS support node.

8. The method of claim 1, wherein the message is received from the access terminal.

9. A method of communication, comprising:
   receiving a message;
   determining an identifier of an access terminal from the message;
   determining paging timing information for the access terminal from the received message or from another received message;
   forwarding the message;
   receiving a packet destined for the access terminal; and
   sending at least one page message to the access terminal based on the receipt of the packet, wherein the at least one page message comprises the identifier determined from the message, and wherein the at least one page message is sent based on the paging timing information.

10. The method of claim 9, wherein the paging timing information comprises discontinuous reception cycle information.

11. An apparatus for communication, comprising:
   a receiver configured to receive a message, and further configured to receive a packet destined for an access terminal;
   a paging controller configured to determine an identifier of the access terminal from the message and to set all paging indicators in a paging indicator channel based on the receipt of the packet; and
   a transmitter configured to forward the message, wherein:
   the paging controller is further configured to send at least one page message to the access terminal based on the receipt of the packet and to send one or more page messages to the access terminal at each paging opportunity in a paging channel, and the at least one page message comprises the identifier determined from the message.

12. The apparatus of claim 11, wherein the packet is received from a local area network associated with an access point that sends the at least one page message.

13. An apparatus for communication, comprising:
a receiver configured to receive a message, and further configured to receive a packet destined for an access terminal;
a paging controller configured to determine an identifier of the access terminal from the received message and to determine paging timing information for the access terminal from the received message or from another received message; and
a transmitter configured to forward the message, wherein the paging controller is further configured to send at least one page message to the access terminal based on the receipt of the packet,
the at least one page message comprises the identifier determined from the message, and
the at least one page message is sent based on the paging timing information.

14. An apparatus for communication, comprising:
means for receiving a message;
means for determining an identifier of an access terminal from the message;
means for forwarding the message;
means for receiving a packet destined for the access terminal;
means for setting all paging indicators in a paging indicator channel based on the receipt of the packet; and
means for sending at least one page message to the access terminal based on the receipt of the packet, wherein the at least one page message comprises the identifier determined from the message, and wherein the means for sending the at least one page message comprises means for sending one or more page messages to the access terminal at each paging opportunity in a paging channel.

15. The apparatus of claim 14, wherein the packet is received from a local area network associated with an access point that sends the at least one page message.

16. An apparatus for communication, comprising:
means for receiving a message;
means for determining an identifier of an access terminal from the message;

means for determining paging timing information for the access terminal from the received message or from another received message;
means for forwarding the message;
means for receiving a packet destined for the access terminal; and
means for sending at least one page message to the access terminal based on the receipt of the packet, wherein the at least one page message comprises the identifier determined from the message, and wherein the at least one page message is sent based on the paging timing information.

17. A non-transitory computer-readable medium comprising code for causing a computer to:
receive a message;
determine an identifier of an access terminal from the message;
forward the message;
receive a packet destined for the access terminal;
set all paging indicators in a paging indicator channel based on the receipt of the packet;
send at least one page message to the access terminal based on the receipt of the packet, wherein the at least one page message comprises the identifier determined from the message; and
send one or more page messages to the access terminal at each paging opportunity in a paging channel.

18. The non-transitory computer-readable medium of claim 17, wherein the packet is received from a local area network associated with an access point that sends the at least one page message.

19. A non-transitory computer-readable medium comprising codes for causing a computer to:
receive a message;
determine an identifier of an access terminal from the message;
determine paging timing information for the access terminal from the received message or from another received message;
forward the message;
receive a packet destined for the access terminal; and
send at least one page message to the access terminal based on the receipt of the packet, wherein the at least one page message comprises the identifier determined from the message, and wherein the at least one page message is sent based on the paging timing information.

* * * * *